Jan. 22, 1952   T. C. GERNER   2,583,261
DEVICE FOR REPAIRING PINION BEARINGS
Filed Nov. 4, 1947   3 Sheets-Sheet 1

Inventor
Theodore C. Gerner

By Clarence A. O'Brien
and Harvey B. Jacobson
Attorneys

Jan. 22, 1952  T. C. GERNER  2,583,261
DEVICE FOR REPAIRING PINION BEARINGS
Filed Nov. 4, 1947  3 Sheets-Sheet 2
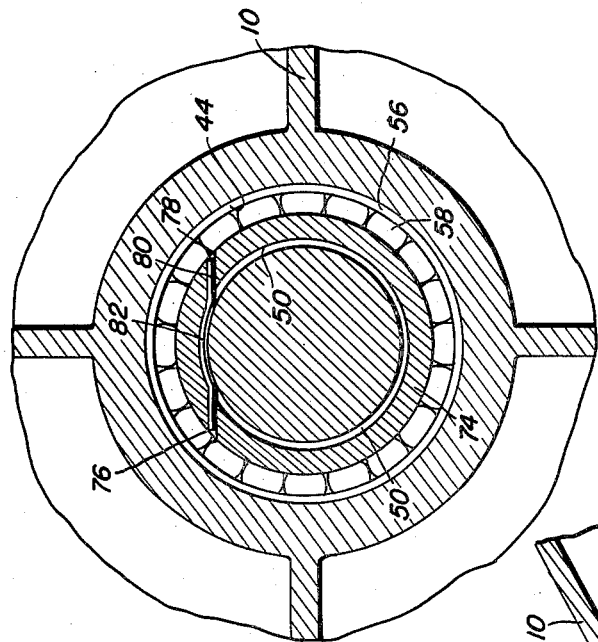
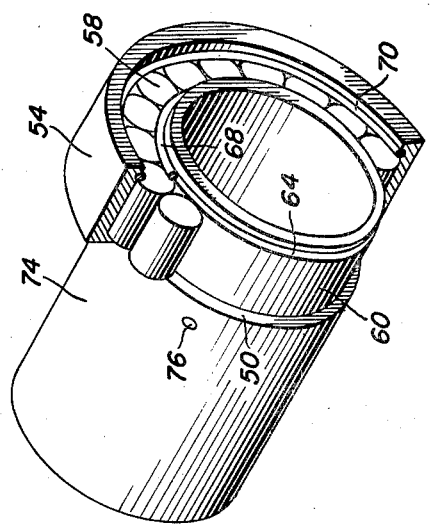
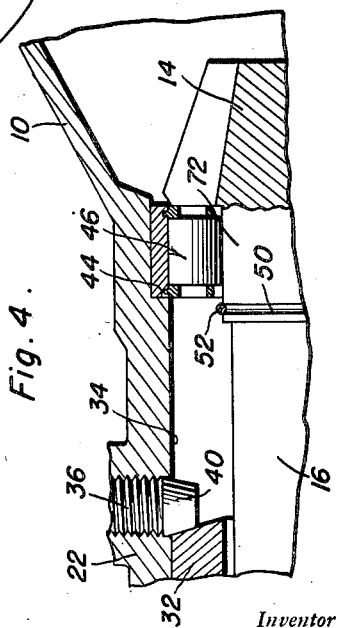
Inventor
Theodore C. Gerner
By Clarence A. O'Brien
and Harvey B. Jacobson
Attorneys Jan. 22, 1952    T. C. GERNER    2,583,261
DEVICE FOR REPAIRING PINION BEARINGS
Filed Nov. 4, 1947    3 Sheets-Sheet 3
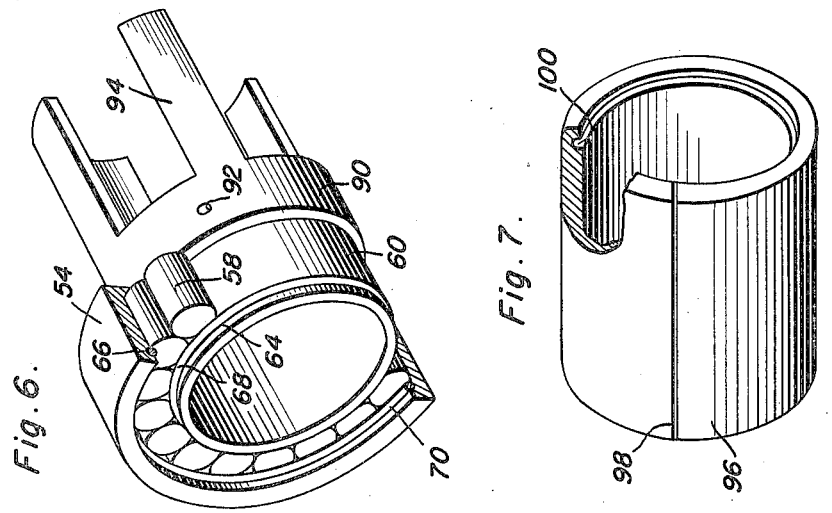
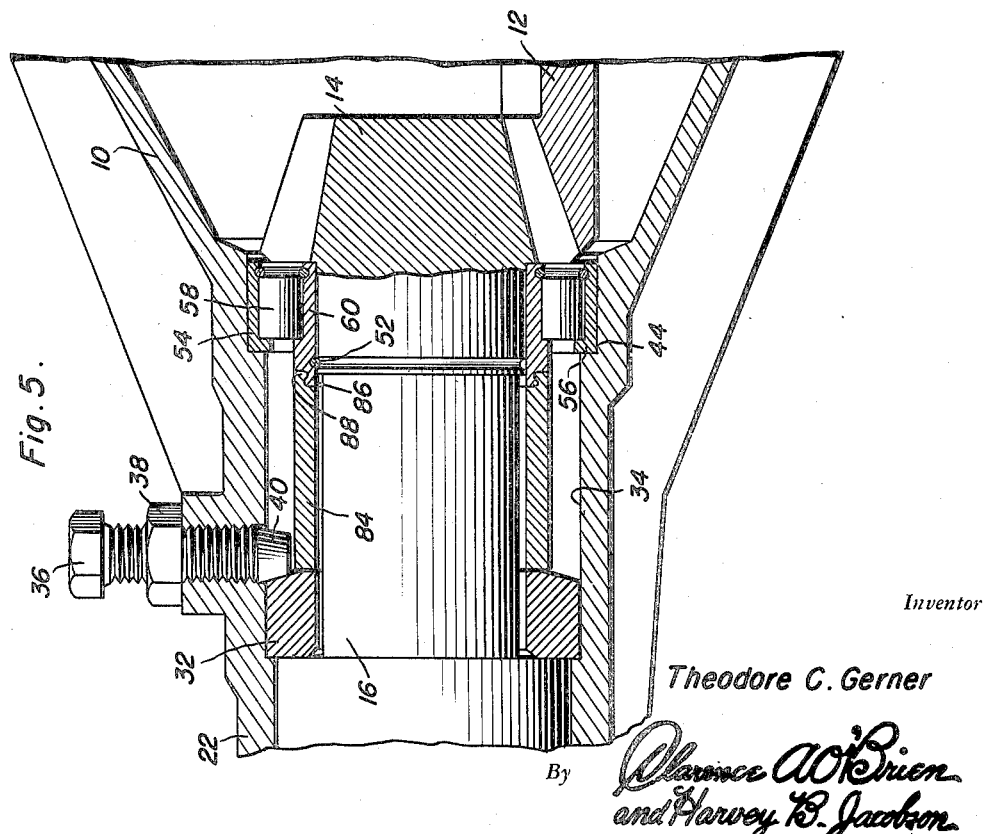
Inventor
Theodore C. Gerner Patented Jan. 22, 1952

2,583,261

UNITED STATES PATENT OFFICE 2,583,261

DEVICE FOR REPAIRING PINION BEARINGS

Theodore C. Gerner, Oklahoma City, Okla.

Application November 4, 1947, Serial No. 783,894

7 Claims. (Cl. 308—207)

This invention comprises novel and useful improvements in a device for repairing pinion bearings and more specifically pertains to a bearing replacement unit for facilitating the replacement of worn pinion bearings in a differential ring gear and pinion bearing assembly.

The principal object of this invention resides in providing a device for facilitating the replacement of worn pinion bearings and which will greatly reduce the time and labor required to effect such replacements.

A further object of the invention resides in providing a device in accordance with the preceding objects which may be employed to condition and reclaim pinion shafts in which the bearing elements thereof have become unduly worn.

A still further important purpose of the invention resides in providing a device in accordance with the preceding objects wherein the replacement unit may be retained upon the pinion shaft by a retaining means engageable with the original rear pinion bearing retaining groove.

A further important purpose of the invention is to provide a replacement unit in accordance with the preceding objects and which shall provide means for retaining and positioning the front pinion bearing locking ring into its assembled position during reassembly of the pinion shaft assembly.

And a final important object of the inventtion to be specifically enumerated herein, resides in providing a repair, reconditioning and replacement unit in conformity with the preceding objects, which shall be of light weight, inexpensive and compact construction, and yet extremely efficient for the purposes intended.

These, together with various ancillary objects of the invention which will later become apparent as the following description proceeds, are attained by this device, preferred embodiments of which have been illustrated, by way of example only in the accompanying drawings, wherein:

Figure 2 is a perspective view, parts being broken away, of the replacement bearing forming the subject of the invention;

Figure 3 is a fragmentary vertical transverse sectional view taken substantially upon the plane of the section line 3—3 and showing more particularly the manner of locking the replacement unit to a pinion shaft;

Figure 4 is a fragmentary, vertical longitudinal sectional view showing a portion of the conventional pinion shaft bearing assembly for which this invention provides a replacement;

Figure 5 is a fragmentary vertical longitudinal sectional view showing a modified form of the invention applied as a replacement assembly in the same manner as that shown in Figure 1;

Figure 6 is a perspective view, parts being broken away, showing yet another embodiment of the bearing replacement device in accordance with this invention; and Figure 7 is a further perspective view, parts being broken away, of yet another embodiment of the invention similar to that shown in Figure 5.

Referring now more particularly to the accompanying drawings, wherein like numerals designate similar parts throughout the various views, attention is directed first to the embodiment of the invention illustrated in Figures 1–4.

Figure 1:
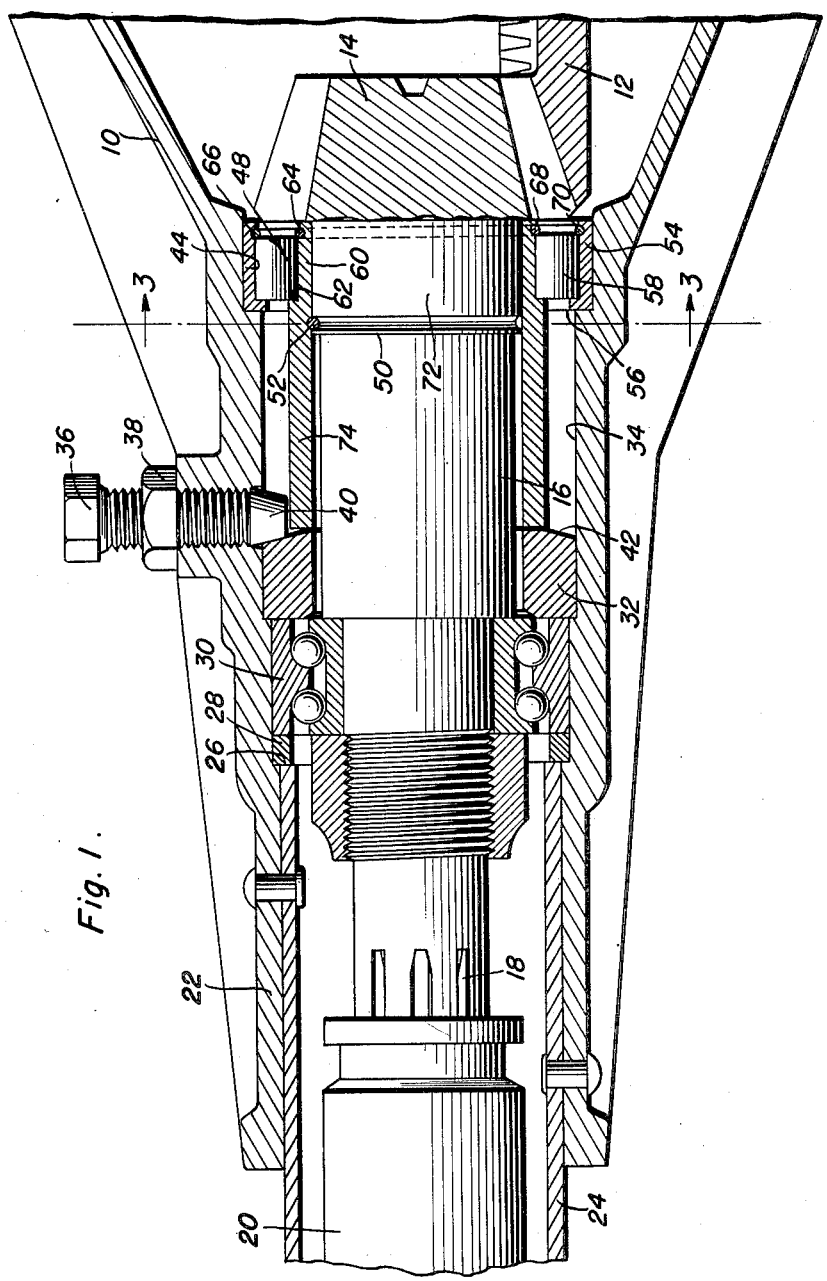
Figure 1 is a vertical longitudinal sectional view through a portion of a ring gear and pinion assembly showing this device installed therein.

There is disclosed at 10 a portion of a conventional differential housing within which is rotatably journalled a ring gear 12 which meshes with a pinion gear 14 carried by the pinion shaft 16 which is splined as at 18 for engagement with a customary propeller shaft 20, which latter is connected by a means not shown, but well-known in the art, to a power plant for driving the wheels and axles of an automotive vehicle.

The differential housing 10 has a forwardly extending tubular portion 22 constituting a housing within which is journalled the pinion shaft 16 and which receives the torque tube or propeller shaft housing 24, all in accordance with conventional design. As is well-known in the art, the bore of the housing extension 22 is provided with a shoulder 26 upon which is seated a spacing or retaining washer 28 forming a seat for the front pinion bearing 30. As shown in Figure 1, the front pinion bearing 30 is customarily provided with an inner and outer bearing race between which are retained two rows of anti-friction balls. The front bearing 30 is retained in seated position against the washer 28 by means of an annular front bearing locking ring 32 which is seated in the enlarged portion 34 of the bore of the housing 22. In further accordance with conventional design, the locking ring 32 is biased against the front bearing 30 by means of one or more radially disposed adjusting screws 36 provided with the customary lock nuts 38 and having frusto-conically tapered inner extremities 40 which engage with the tapered rear surface of the locking ring 32 for urging the same forwardly as the locking bolts 36 are screwed inwardly of the casing 22.

The bore 34 where it merges into the interior of the differential housing 10 is provided with an enlarged portion 44 comprising a seat for the rear pinion bearing indicated at 46 in Figure 4 and for the replacement rear pinion bearing indicated at 48 in Figure 1. Adjacent the rear pinion bearing 46 or the replacement bearing 48, the pinion shaft 16 is provided with an annular groove 50 constituting a locking groove for receiving the rear bearing retaining ring 52 as shown in Figure 4.

As so far described, this structure represents the conventional and well-known pinion bearing assembly of various types of automotive vehicles.

In order to better understand the purposes, functions and advantages of this replacement unit, attention is now directed to the following. In modern automotive vehicles, it is extremely important to maintain the proper lash or adjustment between the mating teeth of the pinion 14 and the ring gear 12. If too tight a fit exists between these gears the teeth are rapidly and unduly worn until breakage occurs; an excessive strain is placed upon the pinion shaft bearings, resulting in damage of the rollers or ball bearings and their races; and in some instances, the pinion shaft itself may be sprung or bent. On the other hand, too great a clearance between the pinion and ring gear teeth results in undue noise or hum, an excessive lash which during accelerating and de-accelerating may result in breakage of pinion teeth or other parts; and further resulting in the imposition of unnecessary and detrimental shocks and strains imparted by the motor to the various elements of the power transmission from the motor to the wheels. It has therefore become customary and highly necessary to maintain a very delicate adjustment of lash between the ring gear and pinion. Obviously, any undue wear in the pinion bearings, including their races and anti-friction elements, or any breakage thereof will further complicate or even render impossible the requisite precision adjustment of the ring gear and pinion.

Heretofore, when such a situation arose as to necessitate the replacement of the front or rear pinion bearings, it was found to be necessary to discard the entire pinion gear and pinion, since the inner race of the rear pinion bearing was formed upon a machined surface of the pinion shaft itself. Consequently, any spalling, excessive wear or marring of the inner race necessarily occasioned the replacement of the entire pinion shaft and pinion in order to restore the proper bearing engagement of the parts. This replacement is necessarily expensive, particularly since ring gears and pinions come in matched sets, whereby the replacement of one necessarily requires the replacement of the other in order to provide a quiet differential gearing.

The replacement unit of this invention is particularly designed to recondition a pinion shaft in which the inner bearing race is marred, and to restore the same to its original efficiency of operation without discarding the shaft, thereby effecting a material economy in making a satisfactory repair. It should be further noted that when a pinion shaft is removed, the locking nuts 36 are customarily released, the locking ring 32 is removed and the front bearing 30 which is pressed upon a suitable seat on the pinion shaft is withdrawn with the unit. When heretofore reassembling a new pinion shaft assembly, it has been found to be extremely difficult to maintain the locking ring 32 in its proper position as the bearings at the front and rear of the pinion shaft are properly seated, and in order to engage the locking ring with the locking screws 36. As will be readily seen from Figure 4, the loose fit of the locking ring in the bore 34 permits the locking ring to be jarred from its proper position by the slightest jar or movement of the pinion shaft during the process of installation. By means of this replacement device, ample provision is made for facilitating the proper positioning of the locking ring and the holding of the locking ring in its proper position as a necessary incident to the seating of the rear bearing in its seat.

The replacement bearing unit, indicated generally at 48, is shown more clearly in Figures 1 and 2, and its fastening means is shown best in Figure 3. This rear bearing replacement unit comprises an outer bearing race 54 which is flanged as at 56 to abut the seat 44. A plurality of anti-friction rollers 58 are received in the outer race although other anti-friction means may be employed if desired.

The inner race 60 of the bearing assembly 48 is further provided with a shoulder 62 cooperating with the flange 56 for limiting axial movement of the roller elements 58 in one direction, and the adjacent surfaces of the inner and outer races 54 and 60 are provided with annular grooves 64 and 66 within which are removably seated annular spring locking rings 68 and 70 respectively.

The inner race 60 is of sufficient diameter to be snugly received upon the original but worn inner race 72 of the rear bearing, which original inner race is formed directly upon a properly machined portion of the pinion shaft.

Extending forwardly from the rear bearing inner race 62, is an annular sleeve 74 of sufficient length for its forward extremity to abut and engage the surface 42 of the locking ring 32, and urge the latter to its seat when the rear bearing replacement assembly 48 is properly seated in its turn. As will be readily seen from Figure 1, the annular sleeve 74 has an internal bore which is a continuation of the inner bore of the inner race 60, whereby the same is slightly spaced from but surrounds the pinion shaft 16 to facilitate its movement thereon. The extension or sleeve 74 is of such outside diameter as to provide ample clearance with the inner extremities of the fastening bolts 36, and thereby avoid interference with the latter as they are adjusted inwardly to force the locking ring 32 and the front bearing 30 to their seats.

As shown best in Figures 2 and 3, a pair of aligned bores 76 and 78 are formed through the extension 74 of the inner race 60, and are disposed as a secant rather than as a diameter of the cylindrical sleeve 74. These bores are designed to intersect the annular locking groove 50 as shown in Figure 3, and a resilient locking pin 80 is forced through these bores, in such manner as to be intermediately deformed in an arcuate fashion as at 82 for resilient, deformable engagement with the locking groove 50. Obviously, this locking pin makes use of the original bearing retaining locking groove of the pinion shaft assembly which is to be reconditioned, for retaining the replacement unit thereon.

By means of the installation of this assembly, as shown in Figure 1, a worn pinion shaft rear bearing inner race may be restored as a satisfactory bearing, and the replacement bearing may be locked upon the pinion shaft by the original locking groove therefor, while the spacing sleeve 74 facilitates the assembly of these parts by positioning and retaining the locking ring 32 in its proper position.

Attention is now directed to the embodiment or modified form of the invention disclosed in Figure 5, wherein all of the parts of the replacement assembly are of identical construction with that set forth in Figures 1-3 except that a spacer sleeve 84 corresponding to the spacer sleeve 74 of Figure 1, is detachably secured to the inner race rather than being formed integral therewith. For this purpose, the forward portion of the inner race 60 may be provided with an annular flange 86 which is engageable by an annular flange 88 carried by the spacer extension 84. This construction gives the same advantages as are present in the foregoing embodiment, but possesses some alternative advantages in that the spacer sleeve 84 may be constructed of a different material, may be separately shipped and stored, and may be omitted or assembled upon the bearing for installation as in the preceding embodiment. Obviously, the spacing sleeve 84 could be of lighter construction since its only utility is in the actual installing and positioning of the locking ring 32. Once the latter has been installed, seated and retained by the adjusting screws 36, the spacer sleeve 84 loses its principal utility.

Figure 5 shows yet another modified form of construction, and is also identical with the construction of Figure 1 except for the arrangement of the spacing sleeve. In this form of the invention, the spacing sleeve may consist of an annular band 90, either formed integral with the inner bearing race 60 as in Figure 1, or separately attached thereto in the manner indicated in Figure 5, and provided with the above mentioned locking bores 92. However, instead of consisting of a continuous cylindrical sleeve, the spacer may comprise a plurality of axial extensions or fingers 94, which are engageable with the locking ring above mentioned for positioning the latter. This construction obviously has the same functions and advantages as the foregoing constructions, with the additional feature that the material required and the weight thereof is considerably less by providing a plurality of fingers rather than a continuous cylindrical sleeve.

In the form of the invention shown in Figure 7, a detachable extension sleeve 96 is indicated which is identical with the sleeve 84 shown in Figure 5 except for a longitudinal slot 98 therein adapted to give resiliency to the device whereby an annular internal channel or groove 100 may engage an annular rib, not shown, corresponding to the annular flange 86. In this construction, the longitudinal slot 98 gives sufficient circumferential resiliency to the extension sleeve to enable the latter to be brought open sufficiently to cause the groove 98 to snap apart and retain the flange 86.

From the foregoing, it will be seen that numerous embodiments may be employed for restoring a worn pinion shaft rear bearing inner race to operative position, while simultaneously assisting in spacing and retaining the front bearing locking ring in position. This device may be installed upon a worn pinion shaft without any alternation or machining of the latter, it being understood that where replacement of a front pinion bearing is necessary the standard bearing supplied for this purpose may be utilized. The great advantage of this device is that where in the original equipment no provision was made for replacing the rear pinion bearing without replacing the entire pinion shaft, a repair may now be effected which is fully as satisfactory in its performance as replaicng the entire shaft assembly but at a great saving in cost and labor as well as facilitating the installation of the front bearing and its locking ring.

Since numerous modifications will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention what is claimed as new is:

1. In a differential ring gear and pinion assembly having a housing, front and rear bearing seats therein, a bearing in said front bearing seat, a pinion shaft journaled in said bearing and an annular peripheral groove in said shaft; the combination therewith of a replaceable rear bearing having an outer race receivable in said rear bearing seat and having an inner race receivable upon the worn original inner face of said shaft, anti-friction members between said races, and means for retaining said replacement inner race upon said original race against relative movement.

2. The combination of claim 1, including a spacer carried by said replacement bearing, said retaining means being carried by said spacer.

3. The combination of claim 1, wherein said retaining means consists of a bore extending through said replacement bearing inner race and positioned to intersect said groove, and a locking pin having an intermediate portion bendable for arcuate seating engagement in said groove.

4. The combination of claim 1, including locking grooves in the adjacent surfaces of said replacement bearing inner and outer races and retaining means seated in said grooves.

5. In a differential ring gear and pinion assembly having a housing, front and rear bearing seats, a bearing in said front seat and a locking ring engaging said bearing and retaining the same in said front seat, a pinion shaft journaled in said bearing; the combination therewith of a replaceable rear bearing having an outer race receivable in said rear bearing seat and having an inner race receivable upon the worn original inner race of said shaft, anti-friction members between said races and a spacer carried by one of said replacement races and extending towards said front bearing, said spacer being of sufficient length to retain said locking ring against said front bearing and the latter in said front seat when said replacement rear bearing is in said rear seat.

6. The combination of claim 5, wherein said spacer is carried by the inner race of the replacement rear bearing.

7. The combination of claim 5, including locking grooves in the adjacent surfaces of said replacement bearing inner and outer races and retaining means seated in said grooves.

THEODORE C. GERNER.

REFERENCES CITED

The following references are of record in the file of this patent:

UNITED STATES PATENTS

| Number | Name | Date |
|---|---|---|
| 1,212,253 | Perkins | Jan. 16, 1917 |
| 1,887,405 | Fogle | Nov. 8, 1932 |
| 2,032,491 | Moreland | Mar. 3, 1936 |
| 2,393,735 | Beezley | Jan. 29, 1946 |